United States Patent [19]

Sundberg

[11] Patent Number: 5,708,408
[45] Date of Patent: Jan. 13, 1998

[54] ELECTRIC RESISTANCE ELEMENT

[75] Inventor: Mats Sundberg, Västerås, Sweden

[73] Assignee: Kanthal AB, Hallstahammar, Sweden

[21] Appl. No.: 627,040

[22] Filed: Apr. 3, 1996

[30] Foreign Application Priority Data

Apr. 11, 1995 [SE] Sweden .................. 9501356

[51] Int. Cl.⁶ .................. H01C 1/012; H05B 3/10
[52] U.S. Cl. .................. 338/306; 219/553
[58] Field of Search .................. 338/306; 219/552, 219/553

[56] References Cited

U.S. PATENT DOCUMENTS 3,681,737  8/1972  Magnusson et al. .................. 338/262
4,267,435  5/1981  Best .................. 219/553
5,611,953  3/1997  Sekhar et al. .................. 219/553

*Primary Examiner*—Stuart N. Hecker
*Attorney, Agent, or Firm*—Alfred J. Mangels

[57] ABSTRACT

An electrical resistance element of the molybdenum silicide type including at least one hot zone and at least two lead-in conductors. The hot zone includes an homogenous silicide material that contains molybdenum and tungsten having the chemical formula $Mo_xW_{1-x}Si_2$, where x is between 0.5 and 0.75. From 10% to 40% of the total of the silicide material is replaced with at least one of the compounds molybdenum boride or tungsten boride; those compounds are present in the silicide material in particle form.

10 Claims, No Drawings

ELECTRIC RESISTANCE ELEMENT

BACKGROUND OF THE INVENTION

1. Field of the Invention

The present invention relates to an electric resistance element of the molybdenum silicide type. In this regard, the invention pertains to an element which is comprised essentially of silicide compounds, where molybdenum constitutes the major part of the metal component in the silicide.

2. Description of the Related Art

Electric resistance elements of the molybdenum silicide type have been long known in the art. Their major use is found in so-called high temperature applications, primarily in ovens that operate at temperatures of about 1,700° C.

Such a resistance element is described in Swedish Patent Specification 458 646, where molybdenum is partially replaced with tungsten in the silicide. The material is an homogenous material having the chemical formula $Mo_xW_{1-x}Si_2$. In the chemical formula, molybdenum and tungsten are isomorphous and can thus replace each other in the same structure. Thus, the material does not constitute a mixture of the materials $MoSi_2$ and $WSi_2$. An element according to this patent specification is marketed under the trade name Kanthal Super 1900.

In principle, the material from which a resistance element is produced first exists in a powdered state. The powder is mixed with a binder, for instance a polymer or a clay and water, and thereafter extruded. The extruded material is then dried and heated to a temperature of 1,400°–1,800° C. in an inert or an oxidizing atmosphere, therewith sintering the grains together.

A resistance element of the kind described in the aforesaid patent specification can be used in ovens at temperatures of up to 1,850° C. in an oxidizing atmosphere while exhibiting an extremely good length of life. This applies, for instance, to standard elements from Kanthal that have a heating zone of 6 and 9 millimeters respectively. Temperatures of up to 1,900° C. are possible in the case of shorter residence times. More slender or thinner elements, such as the standard elements 3/6 and 4/9 having respective heating zone diameters of 3 mm and 4 mm may also be used at temperatures of 1,900° C. for shorter periods, although their use as functional elements in, e.g., laboratory ovens, in which a long length of life is required at maximum use temperatures in combination with separate heating and cooling periods, limits the useful maximum temperature to 1,830° C. In the case of 3/6 elements and to 1,850° C. in the case of 4/9 elements.

The reason why the useful maximum temperature is lower for more slender elements is essentially associated with surface oxidation of the material, which results in the formation of a silica layer on the surface of the material during operation.

Silicon dioxide, $SiO_2$, grows on the surface of the heating element at a parabolic growth rate, which remains the same irrespective of the cross-sectional dimension of the heating element when exposed to oxygen at high temperatures. After the element has been in operation for a few hundred hours at 1,850° C., the layer may well grow to a thickness of from 0.1 to 0.2 mm. As the material cools down to room temperature, the silica layer hardens to thereby subject the base material of the heating element to tensile forces as a result of the pronounced difference between the coefficient of thermal expansion of the base material and the coefficient of thermal expansion of the silica surface. The coefficient of thermal expansion of the silica surface is $0.5 \times 10^{-6}$, whereas the coefficient of thermal expansion of the base material is $7-8 \times 10^{-6}$.

The tensile forces will, of course, increase with increasing thicknesses of the silica layer. Fractures occur in the basic material when the tensile stresses exceed the mechanical strength of said material, such fractures occurring when the silica surface has grown above a certain critical thickness.

In the case of more slender elements, the silica surface constitutes a larger part of the cross-sectional area in relation to the base material than in the case of coarser or thicker elements. Consequently, the critical thickness of the silica layer will be reached much more quickly in the case of a slender element than in the case of a coarser or thicker element at the same working temperature and at the same operating conditions in general.

SUMMARY OF THE INVENTION

The present invention provides considerable improvement in such resistance elements, partly by increasing the mechanical strength of the elements and partly by reducing the growth of silica layers.

Thus, the present invention relates to an electric resistance element of the molybdenum silicide type which includes at least one hot zone and at least two lead-in conductors, wherein the hot zone includes an homogenous silicide material containing molybdenum and tungsten and having the chemical formula $Mo_xW_{1-x}Si_2$, where x is between 0.5 and 0.75, and wherein from 10% to 40% of the total weight is replaced with at least one of the compounds molybdenum boride or tungsten boride; and in that said compounds are present in the silicide material in particle form.

The invention will now be described in more detail.

DETAILED DESCRIPTION OF THE PREFERRED EMBODIMENTS

The invention relates to an electric resistance element of the molybdenum silicide type which includes at least one hot zone and at least two lead-in conductors. The hot zone includes an homogenous silicide material that contains molybdenum and tungsten having the chemical formula $Mo_xW_{1-x}Si_2$, where x is between 0.5 and 0.75.

In accordance with the invention, 10% to 40% of the total weight has been replaced with at least one of the compounds molybdenum boride or tungsten boride. According to the invention, the aforesaid compounds are present in the silicide material in particle form. By this is meant that the compounds are separate grains which are bound mechanically to the powder grains of the homogenous silicide material. Binding is achieved by the aforedescribed sintering process.

It has surprisingly been found that the mechanical strength of the material of an inventive element is improved by at least 25% in comparison with an element comprised of $Mo_xW_{1-x}Si_2$. For instance, an addition of 25% by weight the bending strength at room temperature from 450 MPa to 600 MPa.

According to one preferred embodiment of the invention, x is between 0.6 and 0.7, preferably 0.66.

It is preferred that the compound or compounds constitutes, constitute, between 10% and 20% of the total weight, preferably 15% of the total weight.

Because of the current prices of raw materials, it is preferred that at least the major part of said compounds includes molybdenum boride.

The tungsten boride may be one or more of the tungsten borides WB, $W_2B$, $WB_2$ or $W_2B_5$.

The molybdenum boride may be one or more of the molybdenum borides MoB, $Mo_2B$, $MoB_2$ and $Mo_2B_5$.

It is preferred that the molybdenum boride is MoB and that the tungsten boride is WB, in view of current prices of raw materials.

According to another preferred embodiment of the invention, the aforesaid lead-in conductors are also made of a material which corresponds with the material from which the element is made.

The oxidation growth in the case of an inventive element is lower than the oxidation growth experienced with Kanthal 1900 Super. The oxidation growth on an inventive element at extremely high temperatures, i.e. temperatures above 1,800° C., is up to 50–60% lower than that experienced with Kantha 1900 Super. Consequently, the macroscopic reduction in mechanical strength, caused by the growth of the silica layer, as a function of time, is much lower in the case of the inventive composition, particularly at extremely high temperatures.

The invention thus enables electric resistance elements, even more slender elements, such as 3/6 elements and 4/9 elements to be used in extreme temperature conditions, up to 1880°–1900° C., over many cycles and for many hours. By 3/6 elements and 4/9 elements is meant elements that have a heating zone diameter of 3 millimeters and 4 millimeters respectively.

The high use temperature is made possible by virtue of the favourable effect that tungsten boride and/or molybdenum boride has/have on the mechanical strength of the base material and on the growth of the silica layer, and thereby on the total strength of the element.

The improvements relating to electric resistance elements mentioned in the introduction are therewith achieved by the present invention.

I claim:

1. An electric resistance element of the molybdenum silicide type comprising at least one hot zone and at least two lead-in conductors, wherein the hot zone includes an homogenous silicide material that contains molybdenum and tungsten having the chemical formula $Mo_xW_{1-x}Si_2$, where x is between 0.5 and 0.75, wherein from 10% to 40% of the total weight of the silicide material is replaced with at least one of the compounds molybdenum boride or tungsten boride that are present in the silicide material in particle form.

2. An electric resistance element according to claim 1, wherein x is between 0.6 and 0.7.

3. An electric resistance element according to claim 1, wherein said compounds constitute between 10% and 20% of the total weight.

4. An electric resistance element according to claim 1, wherein at least a major part of said compounds is molybdenum boride.

5. An electric resistance element according to claim 1, wherein the molybdenum boride is selected from the group consisting of MoB, $Mo_2B$, $MoB_2$ and $Mo_2B_5$ and mixtures thereof.

6. An electric resistance element according to claim 1, wherein the tungsten boride is selected from the group consisting of WB, $W_2B$, $WB_2$ or $W_2B_5$ and mixtures thereof.

7. An electric resistance element according to claim 1, wherein the molybdenum boride is MoB and the tungsten boride is WB.

8. An electric resistance element according to claim 1, wherein said lead-in conductors include a material which corresponds to one of the materials from which the resistance element is formed.

9. An electric resistance element according to claim 1, wherein x is about 0.66.

10. An electric resistance element according to claim 1 wherein said compounds constitute about 15% of the total weight.

* * * * *